United States Patent
Murakami et al.

(10) Patent No.: US 8,862,298 B2
(45) Date of Patent: Oct. 14, 2014

(54) DRIVE CONTROL DEVICE OF HYBRID VEHICLE

(75) Inventors: Akira Murakami, Gotenba (JP); Hiroyuki Ogawa, Susono (JP); Takahiro Shiina, Susono (JP); Daisuke Tomomatsu, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 62 days.

(21) Appl. No.: 13/638,728

(22) PCT Filed: Mar. 30, 2010

(86) PCT No.: PCT/JP2010/055756
§ 371 (c)(1),
(2), (4) Date: Oct. 1, 2012

(87) PCT Pub. No.: WO2011/121742
PCT Pub. Date: Oct. 6, 2011

(65) Prior Publication Data
US 2013/0024062 A1    Jan. 24, 2013

(51) Int. Cl.
| | |
|---|---|
| B60L 9/00 | (2006.01) |
| B60K 6/543 | (2007.10) |
| B60K 6/445 | (2007.10) |
| B60K 6/365 | (2007.10) |
| F16H 37/08 | (2006.01) |
| F16H 15/50 | (2006.01) |
| F16H 3/72 | (2006.01) |

(52) U.S. Cl.
CPC ............. *B60K 6/445* (2013.01); *Y02T 10/6239* (2013.01); *F16H 2037/0873* (2013.01); *F16H 37/086* (2013.01); *B60K 6/543* (2013.01); *Y02T 10/76* (2013.01); *F16H 15/50* (2013.01); *F16H 3/728* (2013.01); *B60K 6/365* (2013.01); *Y10S 903/93* (2013.01)
USPC ........ 701/22; 180/65.265; 340/439; 903/930; 475/5; 74/7 E

(58) Field of Classification Search
USPC ........... 701/22; 180/65.265, 65.275; 340/439, 340/438, 459–462; 903/903, 930; 475/5; 74/7 E
See application file for complete search history.

(56) References Cited

U.S. PATENT DOCUMENTS 2,182,458 A * 12/1939 Vickers ........................ 74/388 R
3,293,947 A * 12/1966 Chery ........................... 475/189
(Continued)

FOREIGN PATENT DOCUMENTS

| JP | 9-170533 | 6/1997 |
| JP | 2003-278856 | 10/2003 |
(Continued)

OTHER PUBLICATIONS

International Search Report Issued Jun. 1, 2010 in PCT/JP10/55756 Filed Mar. 30, 2010.
(Continued)

*Primary Examiner* — Helal A Algahaim
*Assistant Examiner* — Shardul Patel
(74) *Attorney, Agent, or Firm* — Oblon, Spivak, McClelland, Maier & Neustadt, L.L.P.

(57) ABSTRACT

In a drive control device of a hybrid vehicle including a power dividing mechanism which has a sun roller, a carrier, and a first disc with which a rotating shaft of a first motor/generator, an output shaft of an engine, and a rotating shaft of a second motor/generator which also functions as an output shaft directed toward drive wheel sides are coupled, respectively and by which differential rotating operations between the sun roller, the carrier, and the first disc are controlled using an alignment chart on which rotation speeds of the sun roller, the carrier, and the first disc are disposed in the sequence of the sun roller, the carrier, the first disc and shown by straight lines.

20 Claims, 8 Drawing Sheets

(56) References Cited

U.S. PATENT DOCUMENTS

| | | | |
|---|---|---|---|
| 5,934,395 A | 8/1999 | Koide et al. | |
| 7,011,600 B2 * | 3/2006 | Miller et al. | 476/36 |
| 7,710,252 B2 * | 5/2010 | Kaya | 340/459 |
| 7,972,237 B2 * | 7/2011 | Ota | 475/5 |
| 8,308,593 B2 * | 11/2012 | Kumazaki et al. | 475/5 |
| 8,430,777 B2 * | 4/2013 | Yamada et al. | 475/5 |
| 8,523,723 B2 * | 9/2013 | Seo et al. | 475/5 |
| 8,628,443 B2 * | 1/2014 | Miller et al. | 475/189 |
| 2003/0181276 A1 | 9/2003 | Minagawa et al. | |
| 2004/0171452 A1 * | 9/2004 | Miller et al. | 475/215 |
| 2013/0024062 A1 | 1/2013 | Murakami et al. | |

FOREIGN PATENT DOCUMENTS

| | | |
|---|---|---|
| JP | 2005-138803 | 6/2005 |
| JP | 2005 138803 | 6/2005 |
| JP | 2005-278281 | 10/2005 |
| JP | 2006-199077 | 8/2006 |
| JP | 2006 199077 | 8/2006 |
| JP | 2006 519349 | 8/2006 |
| JP | 2007 2007-840 | 4/2007 |
| JP | 2007-84065 | 4/2007 |
| JP | 2007 84065 | 4/2007 |
| JP | 2008-222173 | 9/2008 |
| JP | 2009 40132 | 2/2009 |
| JP | 2009-190693 | 8/2009 |
| JP | 2009-227195 | 10/2009 |
| JP | 2009 227195 | 10/2009 |
| JP | 2009 255683 | 11/2009 |
| JP | 2010 935 | 1/2010 |
| JP | 2010-935 | 1/2010 |

OTHER PUBLICATIONS

Notice of Allowance mailed on Apr. 1, 2014 in co-pending U.S. Appl. No. 13/638,401.

International Search Report issued Jun. 1, 2010 in PCT/JP2010/055756.

International Search Report issued Jun. 1, 2010 in PCT/JP2010/055757.

International Search Report issued Jun. 1, 2010 in PCT/JP2010/055756 (previously filed submitting Japanese version).

* cited by examiner

DRIVE CONTROL DEVICE OF HYBRID VEHICLE

FIELD

The present invention relates to a drive control device of a hybrid vehicle including a drive system using at least an engine and an electric rotating machine as power sources.

BACKGROUND

Conventionally, hybrid vehicles including an engine and an electric rotating machine as power sources are known. Further, in this type of hybrid vehicles, there are also known hybrid vehicles provided with a power dividing mechanism capable of distributing input power at a predetermined distribution ratio and outputting the distributed input power.

For example, Patent Literature 1 described below discloses a drive system of a hybrid vehicle provided with a power dividing mechanism for distributing power of an engine to a first motor/generator and to drive wheel sides at a predetermined distribution ratio. The drive system employs a planetary conical mechanism including a carrier coupled with an engine, a sun gear coupled with a first motor/generator, a ring unit coupled with the drive wheel sides, and a pinion unit having a conical abutment surface as the power dividing mechanism. The drive system operates the engine on an optimum fuel consumption line by changing the distribution ratio at a predetermined vehicle speed or more.

Further, Patent Literature 2 described below discloses a drive system of a hybrid vehicle provided with a power dividing mechanism (power distribution device) having a first rotating element coupled with a first motor/generator, a second rotating element coupled with an engine, a third rotating element coupled with an output member, a fourth rotating element, and a switch mechanism for coupling or releasing a second motor/generator with or from the second rotating element or the fourth rotating element. When a transmission ratio (ratio between an engine rotation number and a rotation number of the output member) of the power dividing mechanism is reduced, the drive system couples the second motor/generator with the second rotating element, regeneratively controls the second motor/generator by transmitting a part of power of the engine to the second motor/generator, and supplies generated electric power to the first motor/generator. With the operation, the drive system avoids a so-called power circulation phenomenon in which power of the first motor/generator is converted to electric power by the second motor/generator, and the electric power is supplied to the first motor/generator and converted to power again.

Incidentally, Patent Literature 3 described below discloses a continuously variable transmission provided with a continuously variable transmission mechanism, which has balls (rolling members) clamped between an input disc and an output disc and changes a transmission ratio by adjusting a tilt angle of the balls, and a planetary gear mechanism (differential mechanism) whose one of rotating elements is coupled with an output shaft of the continuously variable transmission mechanism. Specifically, Patent Literature 1 describes the planetary gear mechanism in which a sun gear as one of the rotating elements is coupled with its output shaft, a carrier is coupled with drive wheel sides, and a ring gear is coupled with an output side of a drive power source via a group of gears.

CITATION LIST

Patent Literature

Patent Literature 1: Japanese Patent Application Laid-open No. 2009-040132
Patent Literature 2: Japanese Patent Application Laid-open No. 2006-199077
Patent Literature 3: Japanese Patent Application Laid-open No. 2006-519349

SUMMARY

Technical Problem

However, since the drive system of Patent Literature 1 does not take a power circulation phenomenon into consideration, there is a possibility that a power transmission efficiency is deteriorated. Note that since the drive system of Patent Literature 2 requires a switch mechanism such as a clutch for suppressing an occurrence of power circulation, there is a possibility that a cost is increased and a system becomes large in size.

Accordingly, an object of the present invention is to provide a drive control device of a hybrid vehicle capable of improving the disadvantages of the conventional examples and suppressing a deterioration of power transmission efficiency resulting from the generation of power circulation.

Solution to Problem

In order to achieve the above mentioned object, a drive control device of a hybrid vehicle according to the present invention includes a differential mechanism that includes first to third rotating elements with which a rotating shaft of a first electric rotating machine, an output shaft of an engine, and a rotating shaft of a second electric rotating machine which also functions as an output shaft directed toward drive wheel sides are coupled, respectively and by which differential rotating operations between the first to third rotating elements are controlled using an alignment chart on which rotation speeds of the first to third rotating elements are disposed in the sequence of the first rotating element, the second rotating element, and the third rotating element and shown by straight lines, wherein the differential mechanism can change a rotation ratio obtained by dividing a rotation speed of the first rotating element by a rotation speed of the third rotating element, and in a condition in which power circulation occurs, a rotation ratio between the first rotating element and the third rotating element is controlled on the alignment chart so that the rotation speed of the first rotating element is reduced.

Here, it is desirable that the differential mechanism includes a fourth rotating element having a center axis of rotation common to the first to third rotating elements and rolling members which have a center axis of rotation different from the center axis of rotation as well as can transmit power via contact portions between the first rotating element, the third rotating element, and the fourth rotating element and are held by the second rotating element, and the differential mechanism changes the rotation ratio according to a tilt angle of the rolling members.

Further, it is desirable that the differential mechanism is configured such that the first to third rotating elements have a common center axis of rotation as well as the differential mechanism includes rolling members which are disposed in contact between a radially outside portion of the first rotating element and a radially inside portion of the third rotating element, respectively, held by the second rotating element, and have a center axis of rotation different from the center axis of rotation, and when the rotation ratio is controlled, the rotation ratio is made larger than a predetermined value on the alignment chart.

It is desirable that the differential mechanism includes a fourth rotating element which has a center axis of rotation common to the first to third rotating elements and is disposed in a state that a radially inside portion is caused to be in contact with the rolling members, can transmit power via contact portions between the first rotating element, the third rotating element, and the fourth rotating element, and the rolling members, and changes the rotation ratio according to a tilt angle of the rolling members.

Further, it is desirable that the differential mechanism is configured such that the first to third rotating elements have a common center axis of rotation as well as the differential mechanism includes rolling members which are disposed in contact between a radially inside portion of the first rotating element and a radially outside portion of the third rotating element, respectively, held by the second rotating element, and have a center axis of rotation different from the center axis of rotation, and when the rotation ratio is controlled, the rotation ratio is made smaller than a predetermined value on the alignment chart.

It is desirable that the differential mechanism includes a fourth rotating element which has a center axis of rotation common to the first to third rotating elements and is disposed in a state that a radially inside portion is caused to be in contact with the rolling members, can transmit power via contact portions between the first rotating element, the third rotating element, and the fourth rotating element, and the rolling members, and changes the rotation ratio according to a tilt angle of the rolling members.

In order to achieve the above mentioned object, a drive control device of a hybrid vehicle according to the present invention includes a differential mechanism that includes first to fourth rotating elements with which a rotating shaft of a first electric rotating machine, an output shaft of an engine, a rotating shaft of a second electric rotating machine, and an output shaft directed toward drive wheel sides are coupled, respectively and by which differential rotating operations between the first to fourth rotating elements are controlled using an alignment chart on which rotation speeds of the first to fourth rotating elements are disposed in the sequence of the first rotating element, the second rotating element, the fourth rotating element, and the third rotating element and shown by straight lines, wherein the differential mechanism can change a rotation ratio obtained by dividing a rotation speed of the first rotating element by a rotation speed of the third rotating element and a rotation ratio obtained by dividing the rotation speed of the first rotating element by a rotation speed of the fourth rotating element, and in a condition in which power circulation occurs, a rotation ratio between the first rotating element and the third rotating element and a rotation ratio between the first rotating element and the fourth rotating element are controlled in the alignment chart so that the rotation speed of the first rotating element is reduced.

Here, it is desirable that the differential mechanism has a center axis of rotation different from a center axis of rotation common to the first to fourth rotating elements and includes rolling members which can transmit power via contact portions between the first rotating element, the third rotating element, and the fourth rotating element and held by the second rotating element, and the differential mechanism changes the rotation ratio according to a tilt angle of the rolling members.

Further, it is desirable that the differential mechanism is configured such that the first to fourth rotating elements have a common center axis of rotation as well as the differential mechanism includes rolling members which are disposed in contact between a radially outside portion of the first rotating element and a radially inside portion of the third rotating element, respectively, held by the second rotating element, and have a center axis of rotation different from the center axis of rotation, and when the rotation ratio is controlled, a rotation ratio between the first rotating element and the third rotating element is made larger than a predetermined value as well as a rotation ratio between the first rotating element and the fourth rotating element is made smaller than a predetermined value on the alignment chart.

It is desirable that the differential mechanism can transmit power via contact portions between the first rotating element, the third rotating element, and the fourth rotating element, and the rolling members, disposes the fourth rotating element in a state that a radially inside portion is in contact with the rolling members as well as changes the rotation ratio according to a tilt angle of the rolling members.

Further, it is desirable that the differential mechanism is configured such that the first to fourth rotating elements have a common center axis of rotation as well as the differential mechanism includes rolling members which are disposed in contact between a radially inside portion of the first rotating element and a radially outside portion of the third rotating element, respectively, held by the second rotating element, and have a center axis of rotation different from the center axis of rotation, and when the rotation ratio is controlled, a rotation ratio between the first rotating element and the third rotating element is made smaller than a predetermined value as well as a rotation ratio between the first rotating element and the fourth rotating element is made larger than a predetermined value on the alignment chart.

Further, it is desirable that the differential mechanism can transmit power via contact portions between the first rotating element, the third rotating element, and the fourth rotating element, and the rolling members, disposes the fourth rotating element in a state that a radially inside portion is in contact with the rolling members as well as changes the rotation ratio according to a tilt angle of the rolling members.

Further, it is desirable that the differential mechanism includes a sun roller as the first rotating element, a carrier as the second rotating element, a first disc as the third rotating element, a second disc as the fourth rotating element, and planetary balls as the rolling members.

Further, it is desirable that the differential mechanism includes a first disc as the first rotating element, a carrier as the second rotating element, a sun roller as the third rotating element, a second disc as the fourth rotating element, and planetary balls as the rolling members.

It is desirable that the predetermined value is determined from a rotation ratio between the first rotating element and the third rotating element at which the power circulation does not occur at a present vehicle speed.

Further, it is desirable that when the rotation ratio is controlled, the first electric rotating machine is regeneratively driven as well as the second electric rotating machine is power-driven.

It is desirable that the first electric rotating machine controls rotation speeds of the second rotating element and the third rotating element on the alignment chart so that the rotation speeds do not change before and after a control of the rotation ratio, respectively.

Advantageous Effects of Invention

Since the drive control device of the hybrid vehicle according to the present invention can reduce a deterioration of a power transmission efficiency resulting from a power circulation in the drive system, the power transmission efficiency of the drive system can be improved and a fuel consumption can be also improved. Since the drive control device causes the first electric rotating machine to be power-driven as well as causes the second electric rotating machine to be regeneratively driven, the drive control device can suppress an occurrence of power circulation in which power created by the first electric rotating machine is converted to electric power in the second electric rotating machine and further the first electric rotating machine converts the electric power and outputs power again. When the differential mechanism, which has, for example, the sun roller as the first rotating element connected to the first electric rotating machine, the carrier as the second rotating element connected to the engine, the first disc as the third rotating element connected to the output shaft directed toward the drive wheel sides, the second disc as the fourth rotating element connected to the second electric rotating machine, and the planetary balls as the rolling members, is used, a suppression of deterioration of the power transmission efficiency resulting from the power circulation and a reduction of rotation speed of the second electric rotating machine to a rotation speed of the engine can be realized at the same time only by changing a tilt angle of the planetary balls. Accordingly, since it is not necessary to separately provide a transmission and the like with the second electric rotating machine to reduce the rotation speed of the second electric rotating machine, the second electric rotating machine can be reduced in size.

Further, since the rotation speeds of the second rotating element and the third rotating element are not changed, a change of acceleration/deceleration of the vehicle and a change of fuel consumption amount which may be caused when the rotation speeds are changed can be suppressed, and thereby a deterioration of drivability and a deterioration of a fuel consumption can be suppressed.

DESCRIPTION OF EMBODIMENTS

Embodiments of a drive control device of a hybrid vehicle according to the present invention will be explained below in detail based on drawings. Note that the present invention is not limited by the embodiments.

First Embodiment

A first embodiment of a drive control device of a hybrid vehicle according to the present invention will be explained based on FIGS. 1 to 6.

Figure 1:
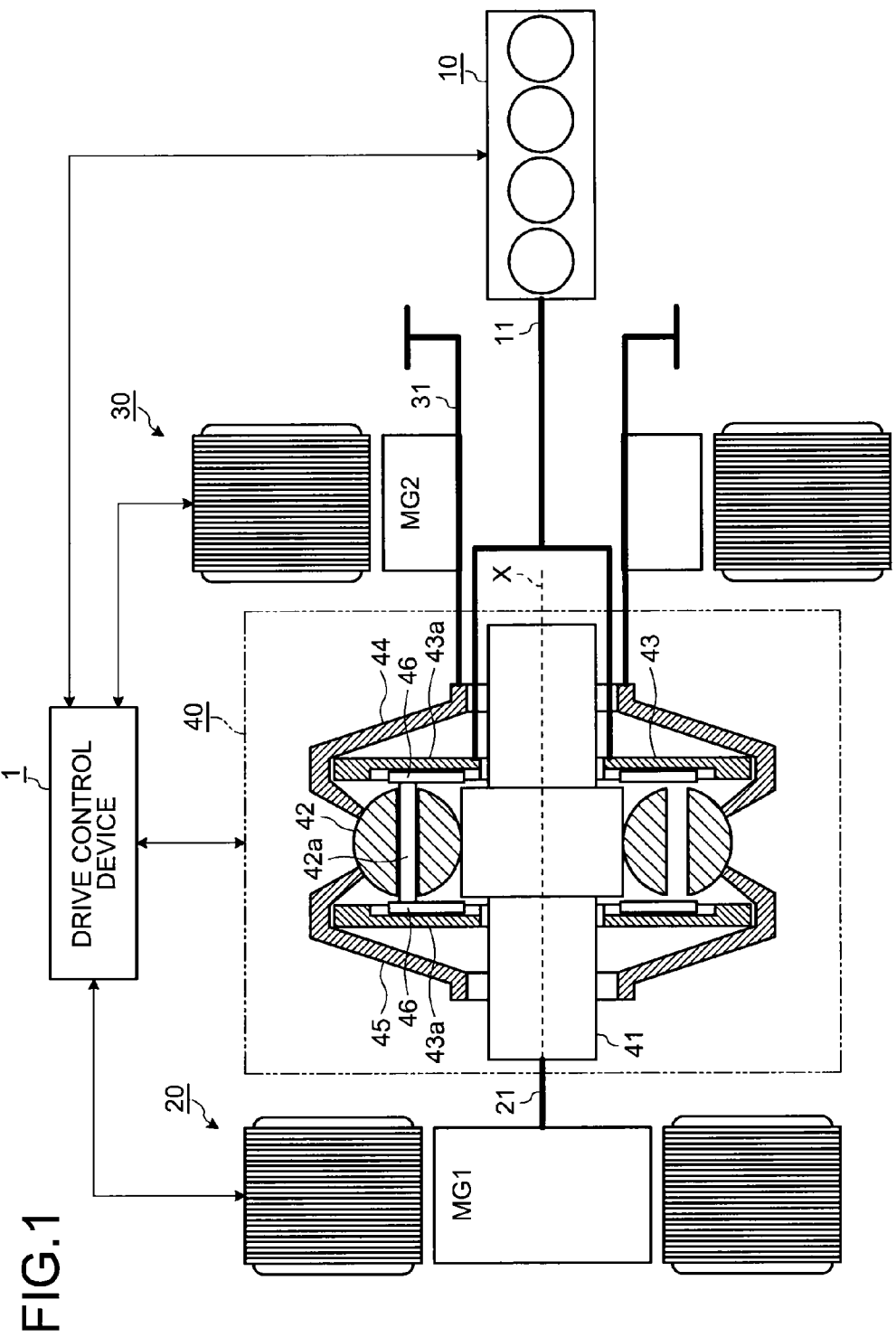
FIG. 1 is a view illustrating a drive control device of a hybrid vehicle according to the present invention and a drive system of a first embodiment.

Reference numeral 1 of FIG. 1 denotes a drive control device (electronic control device: ECU) of the first embodiment. The drive control device 1 performs a control to a drive system of the hybrid vehicle of the first embodiment. First, the hybrid vehicle to which the drive control device 1 is applied, in more detail, a drive system of the hybrid vehicle will be described below in detail based on FIG. 1.

The drive system illustrated in FIG. 1 includes plural types of power sources and a power transmission system for transmitting power of the power sources to drive wheels (not illustrated) as drive force. As the power sources, there are prepared a mechanical power source which uses mechanical energy converted from heat energy as power and an electric power source which uses mechanical energy converted from electric energy as power.

The drive system includes an engine 10 for outputting mechanical power (engine torque) from an output shaft (crank shaft) 11 as the mechanical power source. An internal combustion engine and an external combustion engine are considered as the engine 10. The engine 10 permits operations such as fuel injection and ignition performed by the drive control device 1.

The drive system uses first and second electric rotating machines 20, 30, which are configured as any of a motor, a generator capable performing a powering drive, or a motor/generator capable of performing both a powering drive and a regeneration drive, as electric power sources. Here, explanation will be made exemplifying the motor/generator. Accordingly, hereinafter, the first and second electric rotating machines 20, 30 are called first and second motor/generators 20, 30 (MG1, MG2) respectively. The first and second motor/generators 20, 30 are configured as, for example, a permanent magnet type alternating current synchronous motor and can perform operations such as a powering drive operation by the drive control device 1 via a not illustrated inverter. At the time of powering drive, the first and second motor/generators 20, 30 convert electric energy supplied from a secondary battery (not illustrated) to mechanical energy via the inverter and outputs mechanical power (motor torque) from rotating shafts 21, 31 which are disposed coaxially with a not illustrated rotor. In contrast, at the time of regeneration drive, when mechanical power (motor torque) is input from the rotating shafts 21, 31, the first and second motor/generators 20, 30 convert the mechanical energy to electric energy. The electric energy can be stored in the secondary battery as electric power via the inverter and can be used as electric power when the other motor/generator performs the powering drive.

The power transmission system is prepared with a power dividing mechanism 40 which can distribute input power at a predetermined distribution ratio and output the distributed power. The power dividing mechanism 40 is configured as a differential mechanism which permits differential rotating operations between rotating elements. An explanation will be made exemplifying a so-called traction planetary gear mechanism composed of rotating elements.

The power dividing mechanism 40 includes a sun roller 41, planetary balls 42, a carrier 43, and first and second discs 44, 45 as the rotating elements. Among the rotating elements, the sun roller 41, the carrier 43, and the first and second discs 44, 45 have a common center axis of rotation X. In contrast, each planetary ball 42 has a center axis of rotation different from the center axis of rotation X and rotates (rotates on its center axis of rotation) and rotates (revolves) around the center axis of rotation X. Hereinafter, unless otherwise particularly described, a direction along the center axis of rotation X is called an axis direction and a direction about the center axis of rotation X is called a circumferential direction. A direction orthogonal to the center axis of rotation X is called a radial direction, and a side of the radial direction facing inside is called an inside radial direction and a side thereof facing outside is called an outside radial direction.

The sun roller 41 is located at a center of rotation of the power dividing mechanism 40 and is configured as, for example, a cylindrical rotary member having the center axis of rotation X as its center axis. An outer peripheral surface of the sun roller 41 acts as a rolling surface when the planetary balls 42 rotate on their center axis of rotation. The sun roller 41 may cause the planetary balls 42 to roll by a rotating operation thereof or may be rotated by a rolling operation of the planetary balls 42.

The planetary balls 42 correspond to ball type pinions in the traction planetary gear mechanism and are radially disposed at approximately equal intervals to a radially outside portion (here, outer peripheral surface) of the sun roller 41 about the center axis of rotation X. Further, the planetary balls 42 are disposed between the radially outside portion of the sun roller 41 and radially inside portions (here, inner peripheral surfaces) of the first and second discs 44, 45 in contact with each other. The planetary balls 42 can transmit power between the sun roller 41 and the first disc 44 and the second disc 45 via the contact portions thereof. Since the planetary balls 42 are disposed as rolling members which rotate on their center axes of rotation between the sun roller 41 and the first and second discs 44, 45, although the planetary balls 42 are preferably a perfect spherical member, they may be formed to have an oval sectional shape as in, for example, a rugby ball.

Each planetary ball 42 is rotatably supported by a support shaft 42a passing through a center thereof. For example, the planetary ball 42 can relatively rotate (that is, can rotate on its center axis of rotation) with respect to the support shaft 42a via a bearing (not illustrated) interposed between the planetary ball 42 and an outer peripheral surface of the support shaft 42a. Accordingly, the planetary balls 42 can roll on the outer peripheral surface of the sun roller 41 about the support shafts 42a.

The support shafts 42a are disposed so that center axes thereof are located on a plane including the center axis of rotation X. As illustrated in FIG. 1, positions acting as references of the support shafts 42a are positions at which the center axes of the support shafts 42a are in parallel with, for example, the center axis of rotation X. The support shaft 42a can be swung (tilted) between the reference position and a position tilted from the reference position. The support shaft 42a is tilted in a plane including the center axis of the support shafts 42a and the center axis of rotation X. The tilt operation is performed by a shift mechanism attached to both ends of the support shaft 42a projecting from an outside peripheral curved surface of the planetary ball 42.

The shift mechanism tilts the planetary ball 42 together with the support shaft 42a by operating tilt arms 46 attached to both the ends of the support shaft 42a.

The tilt arms 46 are members for applying tilt force to the support shaft 42a and the planetary ball 42 and tilting a center axis of rotation of the planetary ball 42, that is, a center axis of the support shaft 42a. A pair of the tilt arms 46 is prepared to a support shaft 42a and a planetary ball 42. For example, the tilt arms 46 are molded and disposed so as to extend in a direction vertical with respect to the center axis of rotation X. Radially outside ends of the tilt arms 46 are attached to ends of the support shafts 42a, respectively. One of the pair of the tilt arms 46 moves radially outward and the other of the tilt arms 46 moves radially inward to thereby apply the tilt force to the support shaft 42a and the planetary ball 42. The tilt arms 46 are operably accommodated and held in grooves formed in disc portions 43a of the carriers 43. The grooves are aligned with a number of the tilt arms 46 and formed radially about the center axis of rotation X. Accordingly, the tilt arms 46, the support shafts 42a, and the planetary balls 42 rotate together with the carriers 43.

Although not illustrated, the shift mechanism is further provided with push members for moving the tilt arms 46 radially outward or radially inward and drive units for operating the push members. The tilt force is generated by moving the push members in the axis direction and applying push force of the push members to radially inside portions of the tilt arms 46. For example, the pair of the tilt arms 46 which support the support shafts 42a has radially inside extreme ends whose wall surfaces confronting with each other in the axis direction are tapered radially inward. Further, wall surfaces of both ends of the push members in the axis direction act as contact surfaces in contact with the extreme end taper surfaces of the tilt arms 46, and the contact surfaces are formed in a shape tapering radially outward. With the configuration, when the push force of the push members is applied to the tilt arms 46, since the tilt arms 46 are pushed upward radially outward, the support shafts 42a are tilted and the planetary balls 42 are tilted in association with the tilt operation of the support shafts 42a. As a tilt angle of the planetary ball 42, a reference position of FIG. 1 is set to, for example, 0°. The drive units are, for example, an electrically driven actuator such as an electrically driven motor or a hydraulic pressure actuator and are operated by being controlled by the drive control device 1.

The carrier 43 is a rotating member which can rotate relatively to the sun roller 41 and the first and second discs 44, 45. The carrier 43 has a pair of disc potions 43a which uses the center axis of rotation X as a center axis. The disc potions 43a are disposed at positions where the disc potions 43a sandwich the planetary balls 42, the support shafts 42a and the tilt arms 46 and the like in the axis direction. The disc potions 43a are integrated by not illustrated rod-like support portions. With the configuration, the carrier 43 holds the planetary balls 42, the support shafts 42a and the tilt arms 46 so as to prevent them from relatively moving in the axis direction with respect to the sun roller 41. Further, the carrier 43 rotates the planetary balls 42, the support shafts 42a and the tilt arms 46 about the center axis of rotation X with the rotation itself by the grooves of the disc potions 43a described above.

The first and second discs 44, 45 are rotating members formed in an annular shape or a disc shape using the center axis of rotation X as a center axis, and are disposed to sandwich the planetary balls 42 in confrontation with each other in the axis direction. Specifically, the first and second discs 44, 45 have contact surfaces which come into contact with radially outside peripheral curved surfaces of the planetary balls 42. The contact surfaces have a concave arc surface having a curvature similar to that of the outside peripheral curved surface of the planetary ball 42. The contact surfaces are formed so that distances from the center axis of rotation X to the contact portions with the planetary balls 42 have the same length and contact angles of the first and second discs 44, 45 to the planetary balls 42 have the same angle. The contact angle is an angle from the reference to the contact portions in contact with the planetary balls 42. Here, a radial direction is used as the reference. The contact surfaces are in point contact or in line contact with the outer peripheral curved surfaces of the planetary balls 42. Note that a contact line in the line contact faces a direction orthogonal to a plane when the planetary balls 42 described above tilt. The contact surfaces are formed such that when axis-direction power directed toward the planetary balls 42 is applied to the first and second discs 44, 45, power is applied to the planetary balls 42 radially inward in an oblique direction.

In the power dividing mechanism 40, when the planetary balls 42 have the tilt angle of 0°, the first disc 44 and the second disc 45 rotate at the same number of rotations (at the same rotation speed). That is, at the time, a rotation ratio (ratio of the number of rotations) of the first disc 44 and the second disc 45 becomes 1. In contrast, when the planetary balls 42 are tilted from the reference position, distances from the center axes of the support shafts 42a to the contact portions in contact with the first disc 44 change as well as distances from the center axes of the support shafts 42a to the contact portions in contact with the second disc 45 change. Accordingly, any one of the first disc 44 or the second disc 45 rotates at a speed higher than when it is located at the reference position and the other of the first disc 44 or the second disc 45 rotates at a speed lower than when it is located at the reference position. For example, when the planetary balls 42 are tilted clockwise on a sheet of FIG. 1, the second disc 45 rotates at a speed lower than the first disc 44 (a speed is increased), whereas when the planetary balls 42 are tilted counterclockwise on the sheet of FIG. 1, the second disc 45 rotates at a speed higher than the first disc 44 (a speed is reduced). Accordingly, in the power dividing mechanism 40, the rotation ratio between the first disc 44 and the second disc 45 can be changed continuously by changing the tilt angle of the planetary balls 42.

The power dividing mechanism 40 is provided with push units (not illustrated) for pushing at least any one the first or second disc 44, 45 to the planetary balls 42 and generating nip-pressure between the first and second discs 44, 45 and the planetary balls 42. The push units generate the nip-pressure between the first and second discs 44, 45 and the planetary balls 42 by generating power (push force) in the axis direction. The push force is set to a magnitude by which torque can be transmitted between the sun roller 41 and the first disc 44 and second disc 45 via the planetary balls 42. For example, the push units may be a drive source such as an electrically driven actuator and a hydraulic pressure actuator or may be a mechanism such as a torque cam for generating the push force as the first or second disc 44, 45 as a target for disposition rotates. In the power dividing mechanism 40, the nip-pressure is generated between the first and second discs 44, 45 and the planetary balls 42 by operating the push units so that the push units generate the push force, and thereby friction force is generated between the first and second discs 44, 45 and the planetary balls 42.

In the power dividing mechanism 40, as the sun roller 41 rotates, since the planetary balls 42 are rolled by the friction force, rotation torque generated by the rotation of the planetary balls 42 on their axes is transmitted to the first and second discs 44, 45 and rotate the first and second discs 44, 45. At the time, the carrier 43 rotates about the center axis of rotation X together with the planetary balls 42, the support shafts 42a, and the tilt arms 46. In the power dividing mechanism 40, the rotation torque, which is generated by the planetary balls 42 which are caused to rotate on their axes by the rotation of the first disc 44, is transmitted to the sun roller 41 and the second disc 45 and rotates the sun roller 41 and the second disc 45. In the power dividing mechanism 40, the rotation torque, which is generated by the planetary balls 42 which are caused to rotate on their axes by the rotation of the second disc 45 is transmitted to the sun roller 41 and the first disc 44 and rotates the sun roller 41 and the first disc 44. Further, in the power dividing mechanism 40, since the planetary balls 42 rotate on their axes while revolving in association with the rotation of the carrier 43, rotation torque generated by the rotation of the planetary balls 42 on their axes is transmitted to the sun roller 41 and the first and second discs 44, 45 and rotates the sun roller 41 and the first and second discs 44, 45.

In the first embodiment, the power dividing mechanism 40 is connected to the power sources (engine 10 and first and second motor/generators 20, 30) as described below.

First, the output shaft 11 of the engine 10 is coupled with the carrier 43 (second rotating element). The output shaft 11 rotates integrally with the carrier 43. Further, a rotating shaft 21 of the first motor/generator 20 is coupled with the sun roller 41 (first rotating element). The rotating shaft 21 rotates integrally with the sun roller 41. Further, a rotating shaft 31 of the second motor/generator 30 is coupled with the first disc 44 (third rotating element). The rotating shaft 31 rotates integrally with the first disc 44. In the drive system, the rotating shaft 31 of the second motor/generator 30 acts also as an output shaft on the system directed toward drive wheel sides.

Figure 2:
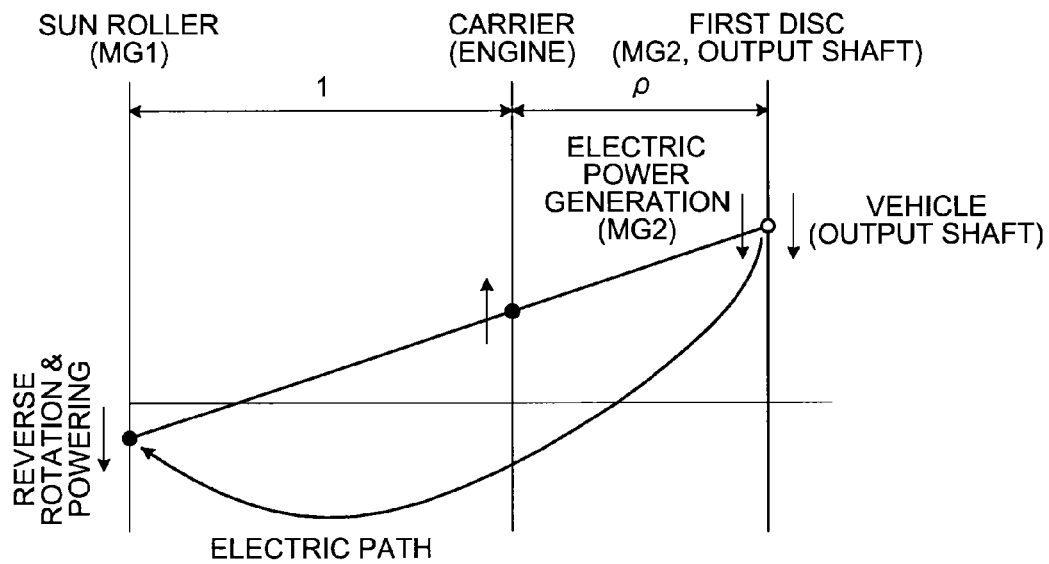
FIG. 2 is an alignment chart of the drive system of the first embodiment.

The drive control device 1 controls the drive system configured as described above using alignment charts which show rotation speeds (the number of rotations) of the first to third rotating elements (the first disc 44 corresponds to the sun roller 41, the carrier 43, and a ring gear) by straight lines. An alignment chart illustrated in FIG. 2 illustrates the rotation speeds of the sun roller 41, the carrier 43, and the first disc 44 by straight lines by sequentially disposing coordinate axes in the sequence of the sun roller 41, the carrier 43, and the first disc 44. In the alignment chart, vertical axes, that is, a sun roller axis, a carrier axis, and a first disc axis disposed sequentially from left show the rotation speeds of the rotating elements. Portions of the vertical axes above a horizontal axis show a positive rotation and portions of the vertical axes below the horizontal axis shows a negative rotation. Further, the horizontal axis shows a relation of ratios (rotation ratios) of the rotation speeds of the sun roller 41, the carrier 43, and the first disc 44. In the alignment charts, the carrier axis is determined at a position where the carrier axis internally divides the sun roller axis and the first disc axis in a relation of 1:ρ. The ρ is a value (rotation ratio) obtained by dividing an absolute value of a relative rotation speed of the first disc 44 to the carrier 43 by an absolute value of a relative rotation speed of the sun roller 41 to the carrier 43, and is so-called a planetary gear ratio.

Figure 3:
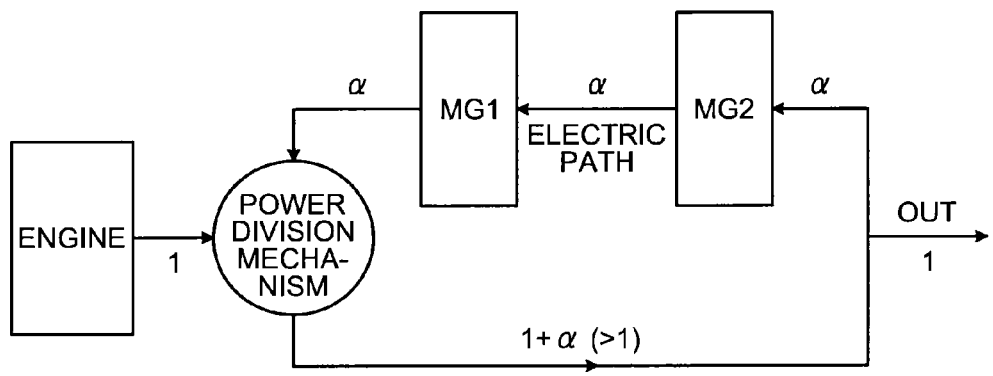
FIG. 3 is a view illustrating a power flow of the drive system in a state illustrated in FIG. 2.

Incidentally, in the drive system shown here, there is a condition in which so-called power circulation phenomenon is generated. For example, the condition in which the power circulation occurs is at the time when a ratio (that is, the planetary gear ratio ρ) between a rotation speed of the output shaft 11 of the engine 10 and a rotation speed of the rotating shaft 31 of the second motor/generator 30 as the output shaft directed toward the drive wheel sides is small and corresponds to the time at which the vehicle travels at a high speed (at the time of high-gear travel). FIG. 2 described above illustrates an example of an alignment chart at the time of high speed travel. Further, FIG. 3 illustrates a power flow of the drive system when a control is performed by the alignment chart. In the drive system of the case, power (1) of the engine 10 and power (α) resulting from a power drive of the first motor/generator 20 (MG1) rotated reverse (negative rotation) are input to the power dividing mechanism 40, and a part (α) of power (1+α) output from the power dividing mechanism 40 is transmitted to the second motor/generator 30 (MG2) as well as a balance (1) of the power is output to the drive wheel sides. At the time, the second motor/generator 30 is regeneratively controlled and generates electric power, and electric power corresponding to the input power (α) is supplied to the first motor/generator 20 (electric path). The first motor/generator 20 converts the electric power to power and outputs the power to the power dividing mechanism 40 again.

The power α in the drive system is as shown in the following expression 1. The symbol "γ" in the expression 1 shows a ratio (transmission ratio) of rotation speeds or a number of rotations between an input and an output of the power dividing mechanism 40 and is determined by, for example, an input number of rotations Nin (engine rotation numbers Ne) and an output number of rotations Nout (a number of rotations Nmg2 of the rotating shaft 31) (γ=Nin/Nout=Ne/Nmg2).

$$\alpha = \frac{\gamma*(1+\rho)-1}{\gamma*(1+\rho)} \quad (1)$$

As described above, in the drive system, there occurs power circulation in which the power (α) generated in the first motor/generator 20 is converted to electric power in the second motor/generator 30, and the first motor/generator 20 further converts the electric power and outputs the power (α) again. Since a state of control of the power circulation illustrated in the alignment chart of FIG. 2 is similar to a control mode by the power dividing mechanism composed of a conventional planetary gear mechanism which cannot change the planetary gear ratio ρ, a loss is generated by the power circulation and thus fuel consumption is lowered by the deterioration of the power transmission efficiency.

In the first embodiment, in a condition in which the power circulation occurs, the planetary gear ratio ρ is controlled in the alignment chart so that a rotation speed (number of rotations) of the sun roller 41 is reduced so that a rotation speed (number of rotations) of the first motor/generator 20 coupled with the sun roller 41 is reduced. In the case, for example, the planetary gear ratio ρ is made larger than a predetermined value in an alignment chart illustrated in FIG. 4 so that the rotation speed of the sun roller 41 is reduced. Here, the rotation speed of the sun roller 41 is approached to 0 by increasing the planetary gear ratio ρ while keeping rotation speeds of the carrier 43 and the first disc 44 constant, respectively. Accordingly, in the drive system, the deterioration of the power transmission efficiency resulting from the power circulation can be reduced.

Figure 4:
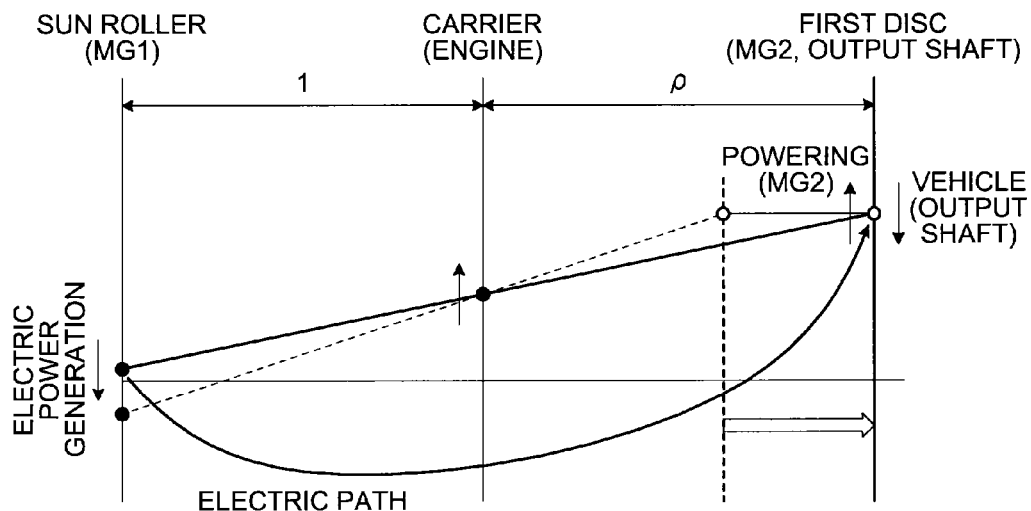
FIG. 4 is an alignment chart of the drive system of the first embodiment and is a view illustrating a state when a control for changing a planetary gear ratio of the first embodiment is executed.
Figure 5:
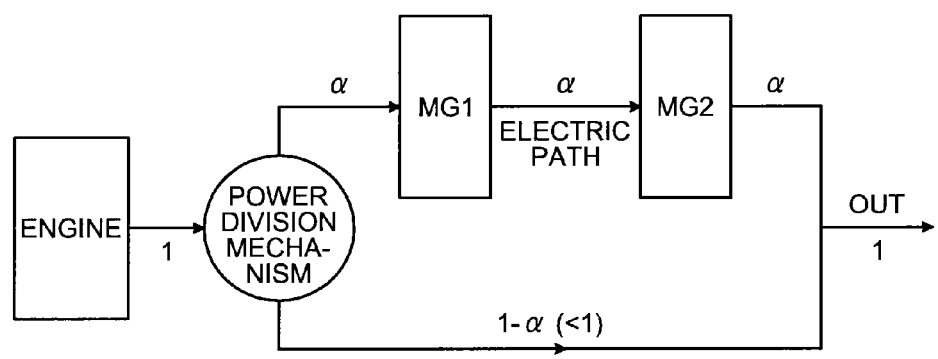
FIG. 5 is a view illustrating a power flow of the drive system in a state illustrated in FIG. 4.

Here, the planetary gear ratio ρ is made larger than the predetermined value in the alignment chart. The predetermined value is preferably set from values of the planetary gear ratio ρ capable of reducing the deterioration of the power transmission efficiency of the drive system resulting from the power circulation at a vehicle speed at the time, the values being previously calculated by experiment and simulation. More preferably, values of the planetary gear ratio ρ at which the power circulation does not occur at the vehicle speed at the time are previously calculated by experiment and simulation and any of the calculated values is set as the predetermined value. The drive control device 1 controls the tilt angle of the planetary balls 42 so that a value requested by the planetary gear ratio ρ is satisfied. Further, when the planetary gear ratio ρ is increased, as illustrated in FIG. 4, the first motor/generator 20 is regeneratively driven as well as the second motor/generator 30 is power-driven. With the operation, in the drive system, as illustrated in a power flow of FIG. 5, the part (α) of the power (1) of the engine 10 input to the power dividing mechanism 40 is transmitted to the first motor/generator 20, whereas a balance (1−α) of the power (1) is transmitted to the drive wheel sides. At the time, the first motor/generator 20 is regeneratively controlled and generates electric power and electric power corresponding to the input power (α) is supplied to the second motor/generator 30 (electric path). The second motor/generator 30 converts the electric power to the power (α) and outputs the power (α) to the drive wheel sides. The power (1) resulting from the power (α) and the power (1−α) from the power dividing mechanism 40 is output to the drive wheel sides. As described above, since the drive system can reduce the deterioration of the power transmission efficiency resulting from the power circulation by executing the control, the fuel consumption can be also improved. In particular, when the predetermined value is set to the planetary gear ratio ρ at which the power circulation does not occur at the vehicle speed at the time, since the occurrence of the power circulation can be suppressed by executing the control and the power transmission efficiency is more improved thereby, the fuel consumption can be further improved.

When a rotation speed of the first disc 44 changes at the time the control is performed, since an acceleration/deceleration of the vehicle changes, there is possibility that a deterioration of drivability may occur. Further, when a rotation speed of the engine 10 changes at the time the control is performed, there is a possibility that the deterioration of drivability occurs by the change of the acceleration/deceleration of the vehicle and the deterioration of the fuel consumption occurs by the change of the fuel consumption amount. Accordingly, when the control is performed, as illustrated in FIG. 4, it is preferable to regeneratively control the first motor/generator 20 so that the rotation speeds of the carrier 43 and the first disc 44 in the alignment chart are not changed, respectively before and after the planetary gear ratio ρ is changed. With the operation, when the control is performed, the deterioration of the drivability resulting from the change of acceleration/deceleration of the vehicle and the deterioration of the fuel consumption resulting from the change of the fuel consumption amount can be suppressed.

Further, in the first embodiment, the traction planetary gear mechanism as described above is used to the power dividing mechanism 40 capable of changing the planetary gear ratio ρ, which contributes to a reduction in size and in cost. Further, in the first embodiment, since no special dedicated parts are necessary to reduce the deterioration of the power transmission efficiency resulting from the power circulation in the drive system or to suppress the occurrence of the power circulation, an object for achieving the reduction and the suppression can be realized at low cost as well as the drive system can be more reduced in size.

Incidentally, the first embodiment can be applied not only to the drive system composed of the configuration described above but also to a mode of FIG. 6 illustrated below. The drive system illustrated in FIG. 6 disposes the second motor/generator 30 to the drive system of FIG. 1 so that the second motor/generator 30 covers an outer peripheral side of the power dividing mechanism 40 formed into an approximately cylindrical shape. In other words, the drive system disposes the power dividing mechanism 40 inside of a rotor of the second motor/generator 30 coaxially with a rotation center axis X.

Also in the drive system, the rotating shaft 31 of the second motor/generator 30 is coupled with the first disc 44 so as to rotate integrally with the first disc 44. In contrast, in the drive system of FIG. 1, although the rotating shaft 31 is used as an output shaft of the drive system directed toward the drive wheel sides, in the drive system, an output shaft 50 is disposed independently of the rotating shaft 31 and coupled with the first disc 44 so as to rotate integrally with the first disc 44.

Also in the drive system, the same operation and effect as those of the drive system of FIG. 1 can be achieved. Further, since the drive system is disposed with the second motor/generator 30 so that the second motor/generator 30 covers the outer peripheral side of the power dividing mechanism 40, the second motor/generator 30, which rotates slower than the first motor/generator 20 and has output torque larger than that of the first motor/generator 20 in specification, can be configured compactly, and thereby the drive system can be more reduced in size, weight, and cost than the drive system of FIG. 1.

Further, in the power dividing mechanism 40 of the drive system exemplified in the first embodiment, the sun roller 41 is applied as the first rotating element with which the first motor/generator 20 is coupled, and the first disc 44 is applied as the third rotating element with which the output shaft on the system directed toward the drive wheel sides (also acts as the rotating shaft 31 of the second motor/generator 30) is coupled. Accordingly, in the exemplification, to reduce the deterioration of the power transmission efficiency resulting from the power circulation at the time the power circulation condition occurs, the planetary gear ratio $\rho$ is made larger than the predetermined value in the alignment chart illustrated in FIG. 4. In contrast, the power dividing mechanism may use the first disc 44 as the first rotating element as well as may use the sun roller 41 as the third rotating element. In the case, to reduce the deterioration of the power transmission efficiency resulting from the power circulation at the time the power circulation condition occurs, the planetary gear ratio $\rho a$ is made smaller than the predetermined value in the alignment chart. Here, the planetary gear ratio $\rho a$ is a value (rotation ratio) obtained by dividing an absolute value of a relative rotation speed of the first disc 44 to the carrier 43 by an absolute value of a relative rotation speed of the sun roller 41 to the carrier 43. In an alignment chart of the case, "$\rho$" is read otherwise to "$\rho a$", "MG1" and "MG2, output shaft" are read otherwise, respectively as well as rotation speeds are reduced in a sequence of a sun roller axis and a carrier axis in, for example, the alignment chart illustrated in FIG. 4. In the alignment chart, since the rotation speed of the first disc 44 is located below a horizontal axis of 0 on a drawing at the time the power circulation condition occurs, the rotation speed (number of rotations) of the first motor/generator 20 coupled with the first disc 44 can be reduced by reducing the planetary gear ratio $\rho a$. Accordingly, also in the drive system of the case, the deterioration of the power transmission efficiency resulting from the power circulation can be reduced.

Second Embodiment

A second embodiment of a drive control device of a hybrid vehicle according to the present invention will be explained based on FIG. 7 to FIG. 9.

Figure 6:
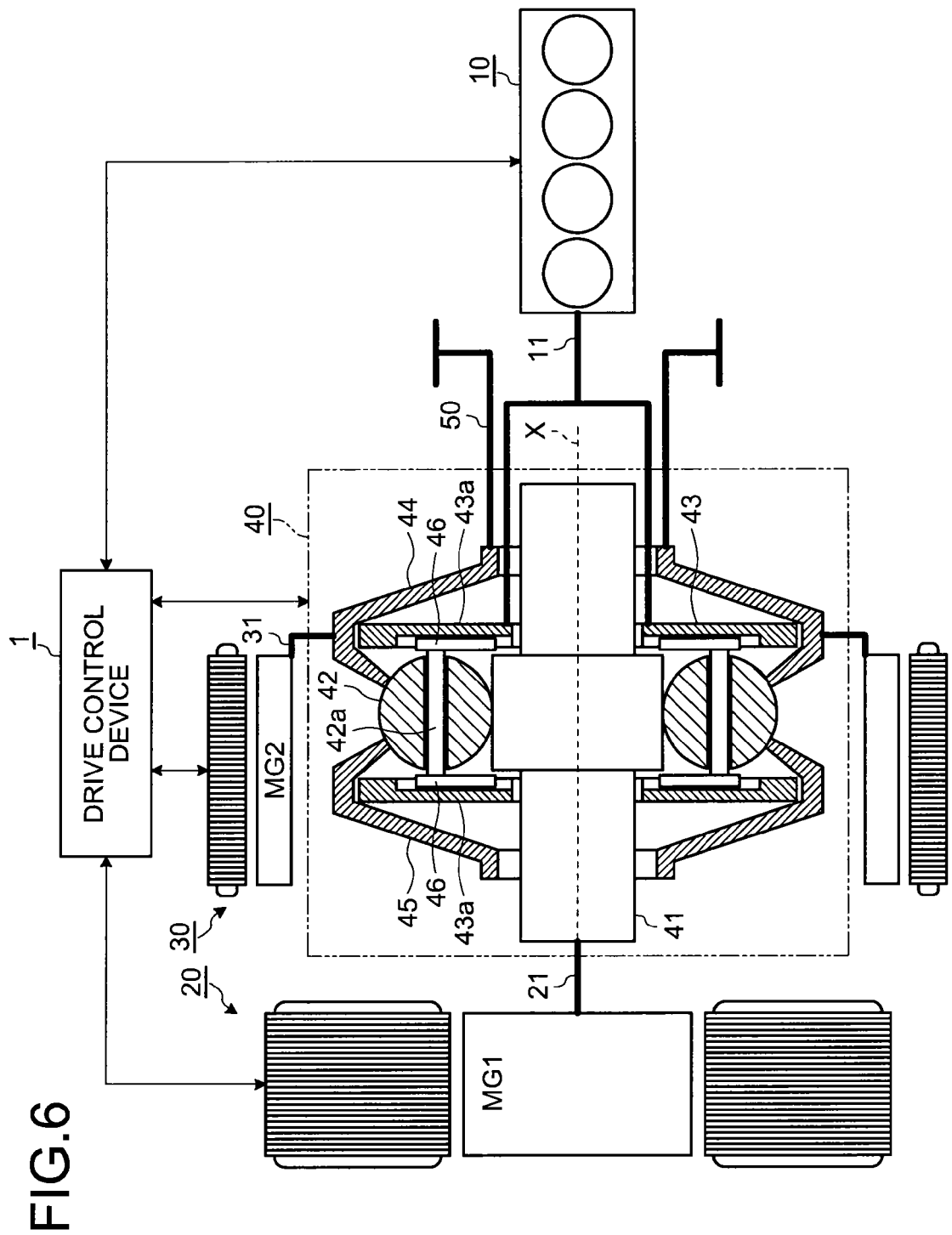
FIG. 6 is a view illustrating another configuration of the drive system of the first embodiment.
Figure 7:
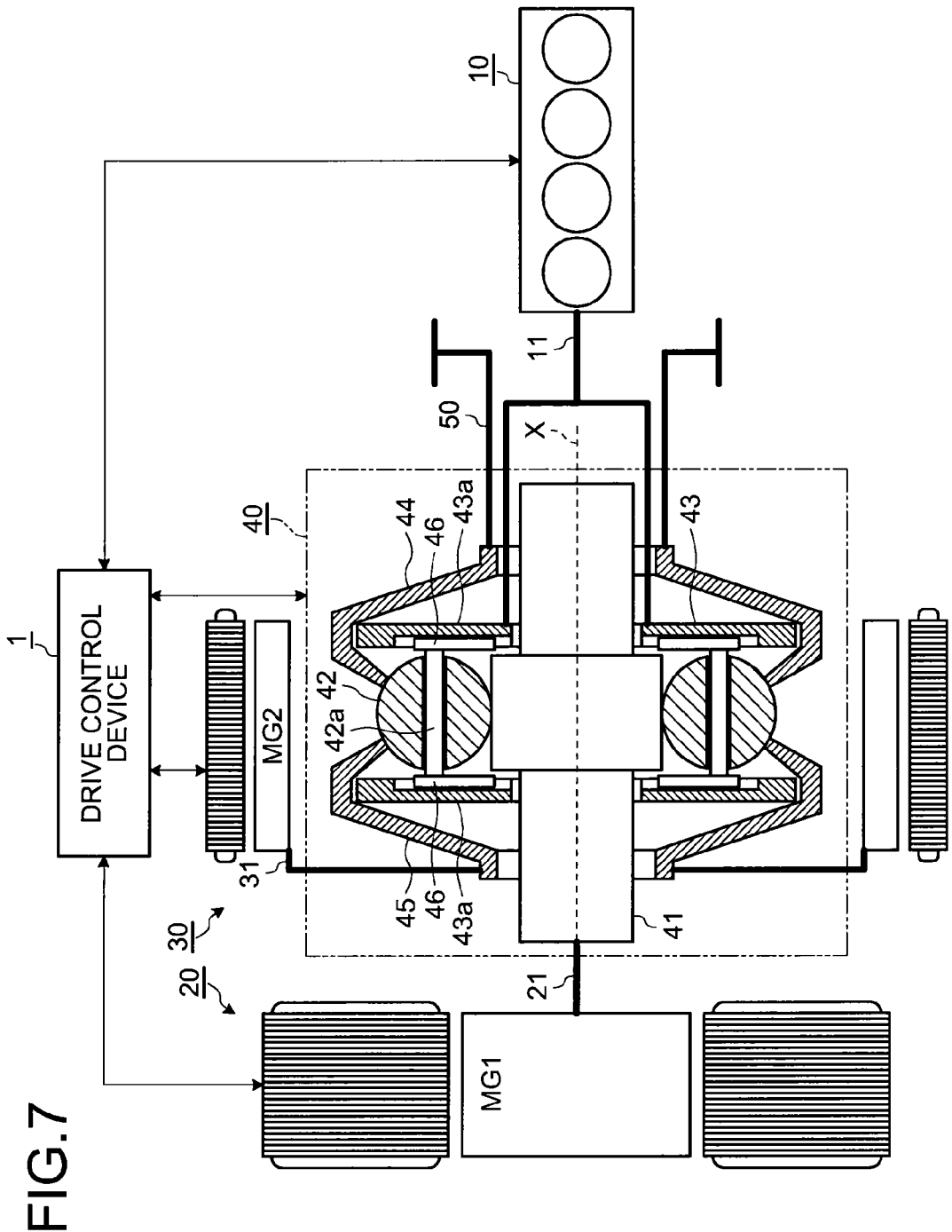
FIG. 7 is a view illustrating the drive control device of the hybrid vehicle according to the present invention and a drive system of a second embodiment.

The drive control device of the second embodiment uses a drive system illustrated in FIG. 7 as a control target. The drive system is configured such that, in the drive system illustrated in FIG. 6 of the first embodiment described above, the rotating shaft 31 of the second motor/generator 30 is coupled with the second disc 45 in place of the first disc 44. The rotating shaft 31 rotates integrally with the second disc 45. Accordingly, the drive system of the second embodiment can achieve the same effect such as a reduction in size as the drive system illustrated in FIG. 6.

Figure 8:
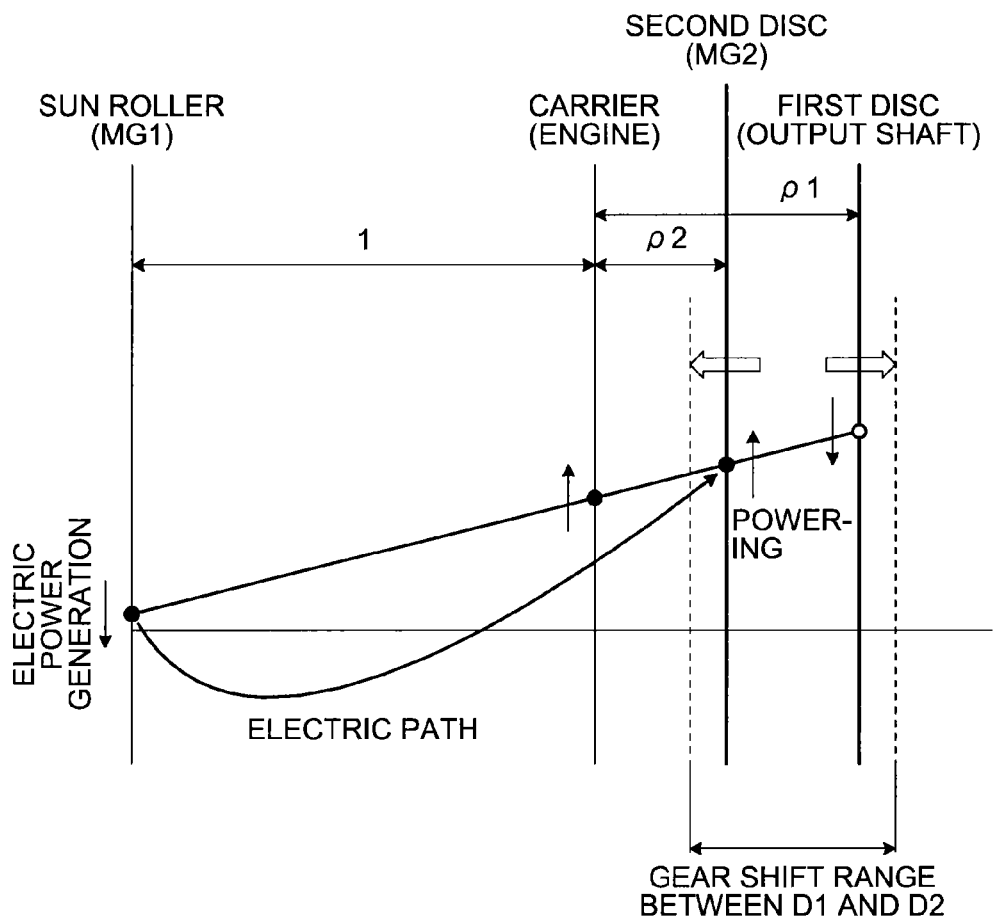
FIG. 8 is an alignment chart of the drive system of the second embodiment and is a view illustrating a state when a control for changing a planetary gear ratio of the second embodiment is executed.
Figure 9:
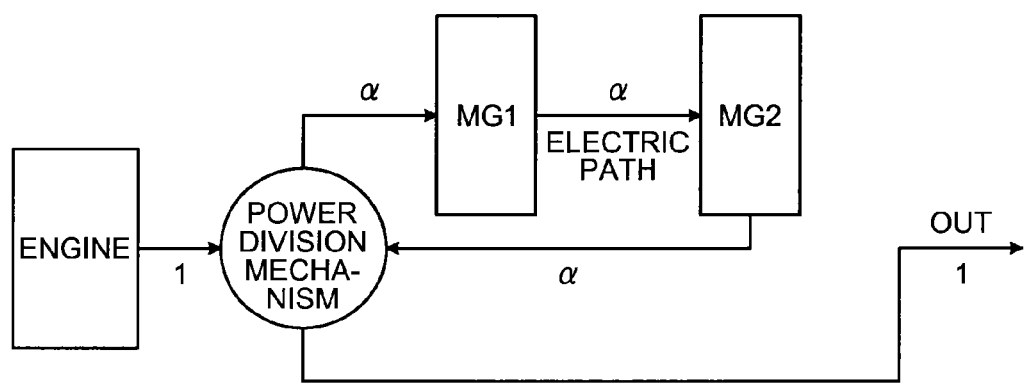
FIG. 9 is a view illustrating a power flow of the drive system in a state illustrated in FIG. 8.

The drive system is controlled by a drive control device 1 using an alignment chart of FIG. 8. The alignment chart shows rotation speeds of a sun roller 41 (first rotating element) a carrier 43 (second rotating element), the second disc 45 (fourth rotating element), and the first disc 44 (third rotating element) by straight lines by sequentially disposing coordinate axes in the sequence of the sun roller 41, the carrier 43, the second disc 45, and the first disc 44. In the alignment chart, vertical axes, that is, a sun roller axis, a carrier axis, a second disc axis, and a first disc axis disposed sequentially from left show the rotation speeds of the rotating elements. Further, horizontal axes show relations of ratios (rotation ratios) of the rotation speeds of the sun roller 41, the carrier 43, the second disc 45, and the first disc 44. In the alignment charts, the carrier axis is determined at a position where the carrier axis internally divides between the sun roller axis and the first disc axis in a relation of 1:$\rho 1$ as well as internally divides between the sun roller axis and the second disc axis in a relation of 1:$\rho 2$. The first planetary gear ratio $\rho 1$ is a value (rotation ratio) obtained by dividing an absolute value of a relative rotation speed of the first disc 44 to the carrier 43 by an absolute value of a relative rotation speed of the sun roller 41 to the carrier 43. Further, the second planetary gear ratio $\rho 2$ is a value (rotation ratio) obtained by dividing an absolute value of a relative rotation speed of the second disc 45 to the carrier 43 by an absolute value of a relative rotation speed of the sun roller 41 to the carrier 43. A relation between the first planetary gear ratio $\rho 1$ and the second planetary gear ratio $\rho 2$ is determined by a tilt angle of the planetary balls 42.

In the drive system configured as described above, when a condition in which power circulation occurs is established, the first and second planetary gear ratios $\rho 1$, $\rho 2$ are controlled in the alignment chart so that the rotation speed (number of rotations) of the sun roller 41 is reduced, and thereby a rotation speed (number of rotations) of a first motor/generator 20 coupled with the sun roller 41 is reduced. For example, in the case, the first planetary gear ratio $\rho 1$ is increased as well as the second planetary gear ratio $\rho 2$ is reduced in the alignment chart illustrated in FIG. 8 so that the rotation speed of the sun roller 41 is reduced. Here, the rotation speed of the sun roller 41 is approached to 0 by controlling the first and second planetary gear ratios $\rho 1$, $\rho 2$ while keeping rotation speeds of the carrier 43 and the first disc 44 constant, respectively. Accordingly, in the drive system, a deterioration of a power transmission efficiency resulting from the power circulation can be reduced.

The first planetary gear ratio ρ1 is made larger than a first predetermined value and the second planetary gear ratio ρ2 is made smaller than a second predetermined value. The first and second predetermined values are preferably set from the values of the first and second planetary gear ratios ρ1, ρ2 capable of reducing the deterioration of the power transmission efficiency of the drive system resulting from the power circulation at a vehicle speed at the time, the values being previously calculated by experiment and simulation. More preferably, values of the first and second planetary gear ratios ρ1, ρ2 at which the power circulation does not occur at the vehicle speed at the time are previously calculated by experiment and simulation and any of the calculated values are set as first and second predetermined values. The first planetary gear ratio ρ1 and the second planetary gear ratio ρ2 are determined so as to fall within a width of a range (that is, a gear shift range) of a rotation ratio between the first disc 44 (D1) and the second disc 45 (D2) in the alignment chart. The range of the rotation ratio depends on a specification of a power dividing mechanism 40. Further, when one of the first planetary gear ratio ρ1 and the second planetary gear ratio ρ2 is determined, the other of the first planetary gear ratio ρ1 and the second planetary gear ratio ρ2 is inevitably determined. The drive control device 1 controls the tilt angle of the planetary balls 42 so that the values requested by the first and second planetary gear ratios ρ1, ρ2 are satisfied.

Further, when the first and second planetary gear ratios ρ1, ρ2 are changed, the first motor/generator 20 is regeneratively driven as well as the second motor/generator 30 is power-driven likewise the first embodiment. With the operation, in the drive system, as illustrated in a power flow of FIG. 9, a part (α) of power (1) of an engine 10 input to the power dividing mechanism 40 is transmitted to the first motor/generator 20. At the time, the first motor/generator 20 is regeneratively controlled and generates electric power and electric power corresponding to the input power (a) is supplied to the second motor/generator 30 (electric path). The second motor/generator 30 of the second embodiment converts the electric power to the power (α) and outputs the power (α) to the power dividing mechanism 40. In the power dividing mechanism 40, the power (1) resulting from the power (α) and a balance power (1−α) at the time the power (α) is passed to the first motor/generator 20 is output to drive wheel sides. As described above, since the deterioration of the power transmission efficiency resulting from the power circulation can be reduced by executing the control also in the drive system of the second embodiment, a fuel consumption can be also improved. In particular, when the first and second predetermined values are set to the first and second planetary gear ratios ρ1, ρ2 at which the power circulation does not occur at the vehicle speed at the time, since the occurrence of the power circulation can be suppressed by executing the control and the power transmission efficiency is more improved thereby, the fuel consumption can be further improved.

The power α in the drive system of the second embodiment is as shown by the following expression 2. The symbol "γ" in the expression 2 is a ratio (transmission ratio) of rotation speeds or a number of rotations between an input and an output of the power dividing mechanism 40 and is determined by, for example, an input number of rotations Nin (engine rotation numbers Ne) and an output number of rotations Nout (a number of rotations No of an output shaft 50) (γ=Nin/Nout=Ne/No).

$$\alpha = \frac{\{\gamma*(1+\rho 1)-1\}*(\rho 2+\gamma*(\rho 1-\rho 2))}{\gamma*\rho 1*(1+\rho 2)} \quad (2)$$

When the control is performed, it is preferable to regeneratively control the first motor/generator 20 so that the rotation speeds of the carrier 43 and the first disc 44 in the alignment chart are not changed, respectively before and after the first and second planetary gear ratios ρ1, ρ2 are changed as shown in also the first embodiment. With the operation, when the control is performed, the deterioration of drivability resulting from the change of acceleration/deceleration of the vehicle and a deterioration of a fuel consumption resulting from the change of a fuel consumption amount can be suppressed. Further, in the drive system of the second embodiment since the second motor/generator 30 can be avoided from being driven at a high rotation speed at the time of high speed travel, a highly efficient drive point of the second motor/generator 30 can be restricted to a low rotation/high torque drive region. Accordingly, in the drive system, since the highly efficient drive point can be made more efficient, the fuel consumption can be improved as well as the second motor/generator 30 can be reduced in size, weight, and cost. The reduction of the second motor/generator 30 in size and weight realizes a reduction of the drive system in size and weight. Further, in the second embodiment, a suppression of the deterioration of the power transmission efficiency resulting from the power circulation and a reduction of the rotation speed of the second motor/generator 30 to the rotation speed of the engine 10 can be realized at the same time only by changing the tilt angle of the planetary balls 42 by the power dividing mechanism 40 composed of the traction planetary gear mechanism. Accordingly, since it is not necessary to separately provide a transmission and the like with the second motor/generator 30 to reduce the rotation speed of the second motor/generator 30, the second motor/generator 30 can be reduced in size.

In the power dividing mechanism 40 of the drive system exemplified in the second embodiment, the sun roller 41 is applied as the first rotating element with which the first motor/generator 20 is coupled, and the first disc 44 is applied as the third rotating element with which the output shaft 50 on the system toward the drive wheel sides is coupled. Accordingly, in the exemplification, to reduce the deterioration of the power transmission efficiency resulting from the power circulation at the time the power circulation condition occurs, the first planetary gear ratio ρ1 is made larger than the first predetermined value and the second planetary gear ratio ρ2 is made smaller than the second predetermined value in the alignment chart illustrated in FIG. 8. In contrast, the power dividing mechanism may use the first disc 44 as the first rotating element as well as may use the sun roller 41 as the third rotating element. In the case, to reduce the deterioration of the power transmission efficiency resulting from the power circulation at the time the power circulation condition occurs, the first planetary gear ratio ρa1 is made smaller than the first predetermined value as well as the second planetary gear ratio ρa2 is made larger than the second predetermined value in the alignment chart. Here, the first planetary gear ratio ρa1 is a value (rotation ratio) obtained by dividing an absolute value of a relative rotation speed of the first disc 44 to the carrier 43 by an absolute value of a relative rotation speed of the sun roller 41 to the carrier 43. Further, the second planetary gear ratio ρa2 is a value (rotation ratio) obtained by dividing an absolute value of a relative rotation speed of the second disc 45 to the carrier 43 by an absolute value of a relative rotation speed of the sun roller 41 to the carrier 43. In an alignment chart of the case, "ρ1" and "ρ2" are read otherwise to "ρa1" and "ρa2", respectively, "MG1" and "output shaft" are read otherwise, respectively as well as rotation speeds are reduced in a sequence of a sun roller axis and a carrier axis in, for example, the alignment chart illustrated in FIG. 8. In the alignment chart, since the rotation speed of the first disc 44 is located below a horizontal axis of 0 on a drawing at the time the power circulation condition occurs, the rotation speed (number of rotations) of the first motor/generator 20 coupled with the first disc 44 can be reduced by reducing the first planetary gear ratio ρa1 as well as increasing the second planetary gear ratio ρa2. Accordingly, also in the drive system of the case, the deterioration of the power transmission efficiency resulting from the power circulation can be reduced.

Figure 10:
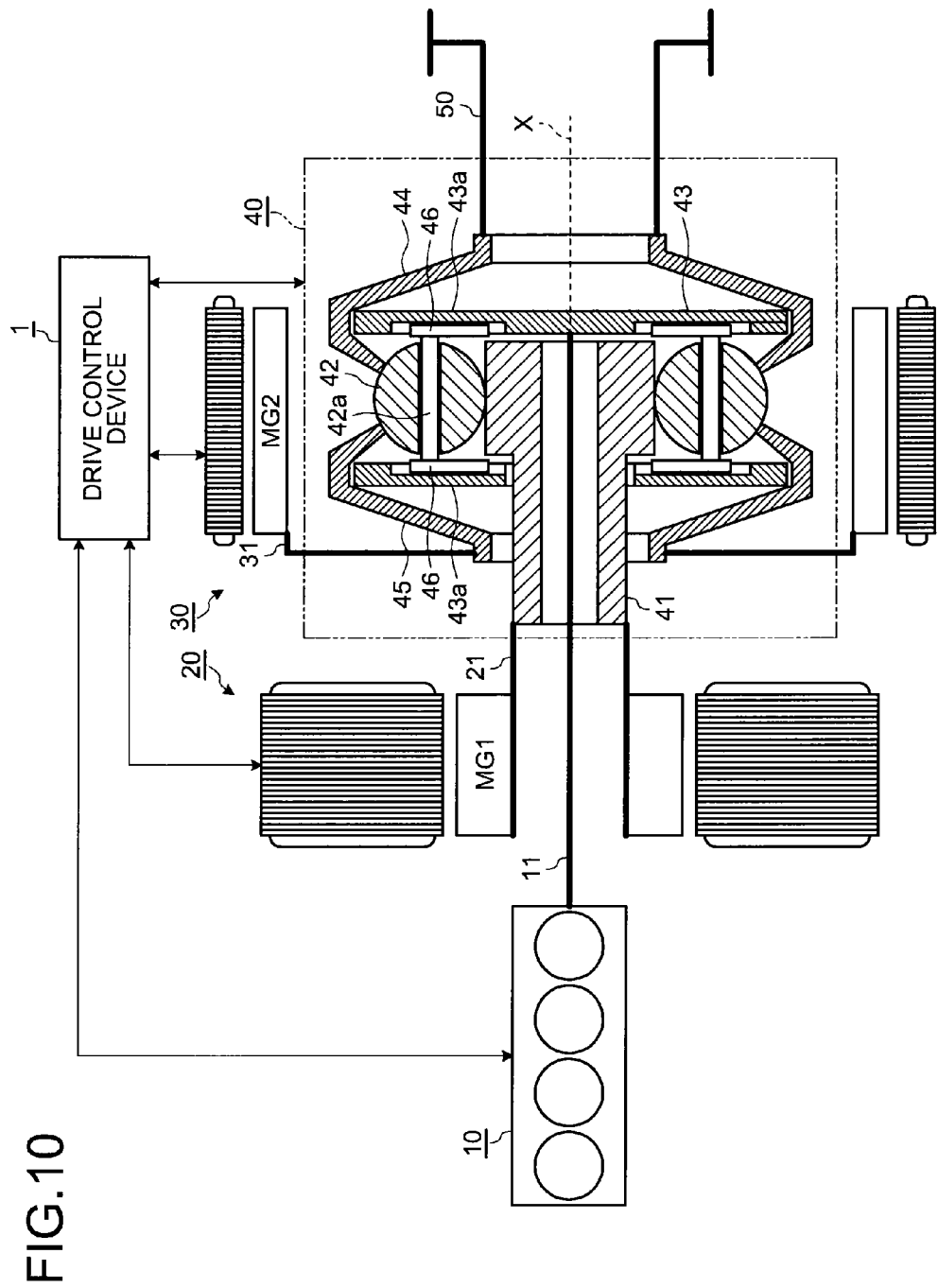
FIG. 10 is a view illustrating other mode of the drive system.

Incidentally, although the output shaft 11 of the engine 10 in the first and second embodiments described above is exemplified assuming that the output shaft 11 is connected to the carrier 43 on the outer peripheral surface side of the sun roller 41 (strictly, a support shaft for rotatably supporting the sun roller), and in the drive system illustrated in FIG. 1, 6 or 7, the support shaft may be composed of a hollow shaft and the output shaft 11 may be connected to the carrier 43 through a hollow portion. The drive system modified as described above can also achieve an effect similar to that of the drive system which is illustrated in FIG. 1, 6 or 7 and acts as a base of the modification. FIG. 10 illustrates an example of the modification. A drive system of FIG. 10 improves the drive system illustrated in FIG. 7. In the drive system of FIG. 10, the output shaft 11 is further disposed on the first motor/generator 20 side and connected to the carrier 43 via a center of an annular rotor in the first motor/generator 20. With the configuration, in the drive system, since an input and an output are disposed along a straight line on both sides of the power dividing mechanism 40 located at a center between the input and the output, respective elements can be simply connected, and the drive system is particularly useful as a system for a FR (front engine/rear drive) vehicle. Accordingly, the drive system not only obtains an effect similar to that of the drive system of FIG. 7 but also allows a reduction in size, weight, and cost as a system for the FR vehicle.

Figure 11:
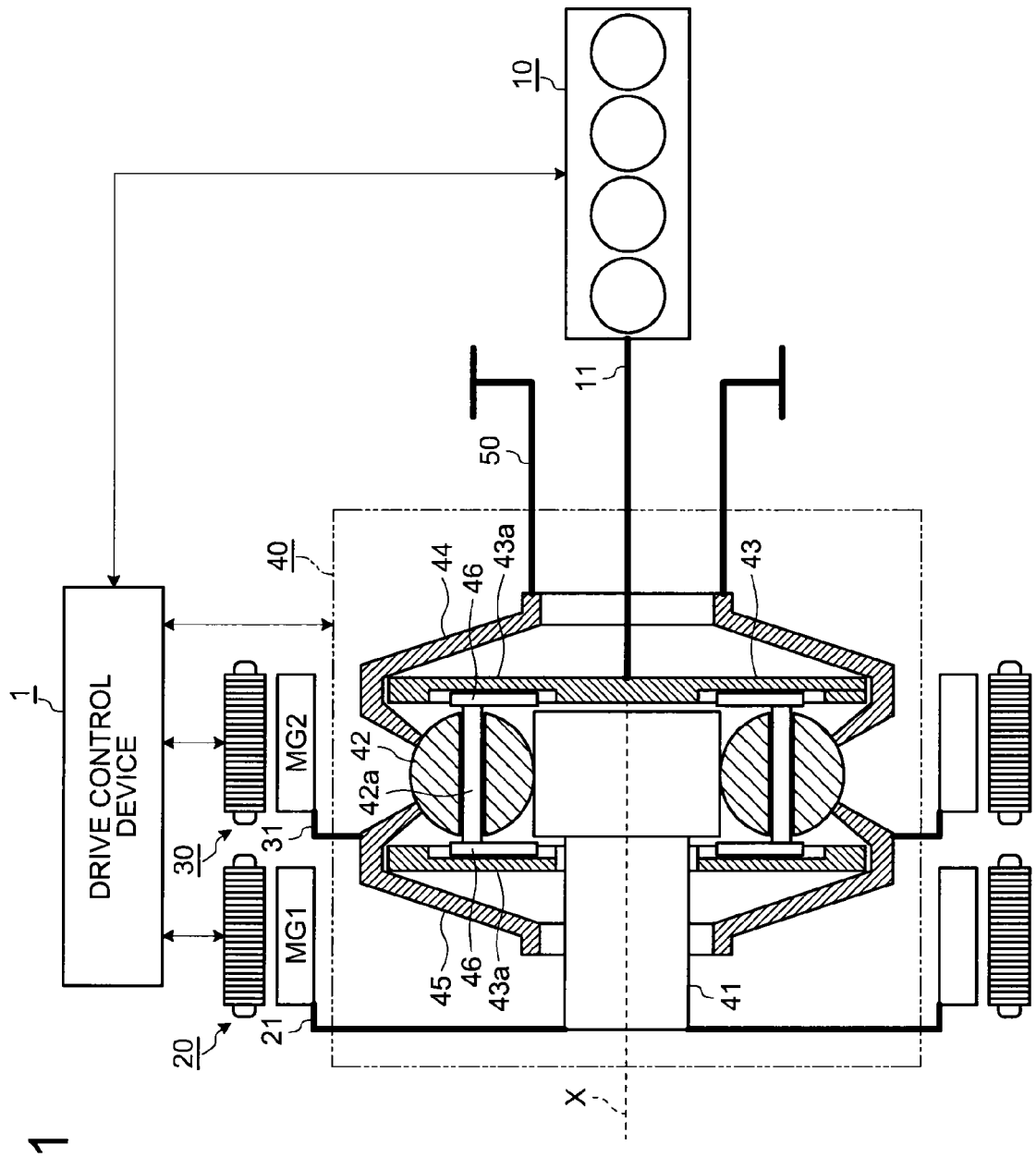
FIG. 11 is a view illustrating other mode of the drive system.

Further, although the first motor/generator 20 of the drive system described above and illustrated in FIG. 1, 6, 7 or 10 is disposed in confrontation with the second disc on a rotation center axis X, the first motor/generator 20 may be disposed so as to cover the outer peripheral side of the power dividing mechanism 40 in the drive system likewise the second motor/generator 30 illustrated in FIG. 6 and the like. The drive system modified as described above can also achieve an effect similar to that of the drive system which is illustrated in FIG. 1, 6, 7 or 10 and acts as a base of the modification. Further, since the drive system can configure the second motor/generator 30 compactly, an axis length can be shortened, which allows a further reduction in size, weight, and cost. FIG. 11 illustrates an example of the drive system. The drive system of FIG. 11 improves the drive system illustrated in FIG. 7. In the drive system of FIG. 11, since the second motor/generator 30 is configured also compact, an axis length is further shortened, which allows a reduction in size, weight, and cost.

INDUSTRIAL APPLICABILITY

As described above, the drive control device of the hybrid vehicle according to the present invention is useful as a technology for suppressing a deterioration of a power transmission efficiency resulting from an occurrence of a power circulation.

REFERENCE SIGNS LIST

1 DRIVE CONTROL DEVICE
10 ENGINE
11 OUTPUT SHAFT
20 FIRST MOTOR/GENERATOR (FIRST ELECTRIC ROTATING MACHINE)
21 ROTATING SHAFT
30 SECOND MOTOR/GENERATOR (SECOND ELECTRIC ROTATING MACHINE)
31 ROTATING SHAFT
40 POWER DIVIDING MECHANISM
41 SUN ROLLER
42 PLANETARY BALL
42a SUPPORT SHAFT
43 CARRIER
44 FIRST DISC
45 SECOND DISC
46 TILT ARM
50 OUTPUT SHAFT
X ROTATION CENTER AXIS

The invention claimed is:

1. A drive control device of a hybrid vehicle, comprising: a differential mechanism that includes first to third rotating elements with which a rotating shaft of a first electric rotating machine, an output shaft of an engine, and a rotating shaft of a second electric rotating machine which also functions as an output shaft directed toward drive wheel sides are coupled, respectively, a fourth rotating element having a center axis of rotation common to the first to third rotating elements, and rolling members which have a center axis of rotation different from the center axis of rotation as well as can transmit power via contact portions between the first rotating element, the third rotating element, and the fourth rotating element and are held by the second rotating element and by which differential rotating operations between the first to third rotating elements are controlled using an alignment chart on which rotation speeds of the first to third rotating elements are disposed in the sequence of the first rotating element, the second rotating element, and the third rotating element and shown by straight lines and in which a rotating speed shaft of the second rotating element internally divides between a rotating speed shaft of the first rotating element and a rotating speed shaft of the third rotating element by a relation of 1:ρ, wherein the differential mechanism changes the internal ratio of 1:ρ by changing a planetary gear ratio ρ which is obtained by dividing an absolute value of a relative rotation speed of the third rotating element to the second rotating element on the alignment chart by an absolute value of a relative rotation speed of the first rotating element to the second rotating element by changing a tilt angle of the rolling members, and in a condition in which power circulation is generated, the planetary gear ratio ρ is controlled on the alignment chart so that a rotation speed of the first rotating element is reduced with respect to a rotation speed at a time of generating the power circulation.

2. The drive control device of the hybrid vehicle according to claim 1, wherein when a rotating speed of the first rotating element is reduced at the time the rolling members are disposed in contact between a radially outside portion of the first rotating element and radially inside portions of the third rotating element and the fourth rotating element, respectively, the planetary gear ratio ρ is made larger than a predetermined value on the alignment chart.

3. The drive control device of the hybrid vehicle according to claim 2, wherein
the predetermined value is determined from a the planetary gear ratio ρ at which the power circulation is not generated at a present vehicle speed.

4. The drive control device of the hybrid vehicle according to claim 2, wherein
the differential mechanism includes a sun roller as the first rotating element, a carrier as the second rotating element, a first disc as the third rotating element, a second disc as the fourth rotating element, and planetary balls as the rolling members.

5. The drive control device of the hybrid vehicle according to claim 2, wherein
when a rotation speed of the first rotating element is reduced, the first electric rotating machine is regeneratively driven as well as the second electric rotating machine is power-driven.

6. The drive control device of the hybrid vehicle according to claim 1, wherein
when the rolling members are disposed in contact between a radially outside portion of the third rotating element and radially inside portions of the first rotating element and the fourth rotating element, respectively, the alignment chart assumes that a rotating speed shaft of the second rotating element internally divides between a rotating speed shaft of the third rotating element and a rotating speed shaft of the first rotating element in a relation of 1:ρa by a planetary gear ratio ρa which is obtained by dividing an absolute value of a relative rotation speed of the first rotating element to the second rotating element by an absolute value of a relative rotation speed of the third rotating element to the second rotating element, and when a rotation speed of the first rotating element is reduced, the planetary gear ratio ρa is made smaller than a predetermined value on the alignment chart.

7. The drive control device of the hybrid vehicle according to claim 6, wherein
the predetermined value is determined from a the planetary gear ratio ρa at which the power circulation is not generated at a present vehicle speed.

8. The drive control device of the hybrid vehicle according to claim 6, wherein
the differential mechanism includes a first disc as the first rotating element, a carrier as the second rotating element, a sun roller as the third rotating element, a second disc as the fourth rotating element, and planetary balls as the rolling members.

9. The drive control device of the hybrid vehicle according to claim 6, wherein
when a rotation speed of the first rotating element is reduced, the first electric rotating machine is regeneratively driven as well as the second electric rotating machine is power-driven.

10. The drive control device of the hybrid vehicle according to claim 1, wherein
the differential mechanism includes a sun roller as the first rotating element, a carrier as the second rotating element, a first disc as the third rotating element, a second disc as the fourth rotating element, and planetary balls as the rolling members.

11. The drive control device of the hybrid vehicle according to claim 1, wherein
the differential mechanism includes a first disc as the first rotating element, a carrier as the second rotating element, a sun roller as the third rotating element, a second disc as the fourth rotating element, and planetary balls as the rolling members.

12. The drive control device of the hybrid vehicle according to claim 1, wherein
when a rotation speed of the first rotating element is reduced, the first electric rotating machine is regeneratively driven as well as the second electric rotating machine is power-driven.

13. The drive control device of the hybrid vehicle according to claim 1, wherein
the first electric rotating machine controls rotation speeds of the second rotating element and the third rotating element on the alignment chart so that the rotation speeds do not change before and after a control executed when a rotation speed of the first rotating element is reduced, respectively.

14. A drive control device of a hybrid vehicle, comprising:
a differential mechanism that includes first to fourth rotating elements with which a rotating shaft of a first electric rotating machine, an output shaft of an engine, an output shaft directed toward a drive wheel side, and a rotating shaft of a second electric rotating machine are coupled, respectively and rolling members which have a center axis of rotation different from a common center axis of rotation in the first to fourth rotating elements, can transmit power via contact portions between the first rotating element, the third rotating element, and the fourth rotating element, and are held by the second rotating element and by which differential rotating operations between the first to fourth rotating elements are controlled using an alignment chart on which rotation speeds of the first to fourth rotating elements are disposed in the sequence of the first rotating element, the second rotating element, the fourth rotating element, and the third rotating element and shown by straight lines and in which a rotating speed shaft of the second rotating element internally divides between a rotating speed shaft of the first rotating element and a rotating speed shaft of the third rotating element by a relation of 1:ρ1 and a rotating speed shaft of the second rotating element internally divides between the rotating speed shaft of the first rotating element and a rotating speed shaft of the fourth rotating element by a relation of 1:ρ2, wherein
the differential mechanism changes the internal ratios of 1:ρ1 and 1:ρ2 by changing a first planetary gear ratio ρ1 which is obtained by dividing an absolute value of a relative rotation speed of the third rotating element to the second rotating element by an absolute value of a relative rotation speed of the first rotating element to the second rotating element and a second planetary gear ratio ρ2 which is obtained by dividing an absolute value of a relative rotation speed of the fourth rotating element to the second rotating element by an absolute value of a relative rotation speed of the first rotating element to the second rotating element on the alignment chart by changing a tilt angle of the rolling members; and
in a condition in which power circulation is generated, the first and second planetary gear ratios ρ1, ρ2 are controlled on the alignment chart so that a rotation speed of the first rotating element is reduced with respect to a rotation speed at a time of generating the power circulation.

15. The drive control device of the hybrid vehicle according to claim 14, wherein
when a rotation speed of the first rotation element is reduced at the time the rolling members are disposed in contact with a radially outside portion of the first rotation element and radially inside portions of the third rotation element and the fourth rotating element, the first planetary gear $\rho 1$ is made larger than a predetermined value and the second planetary gear ratio $\rho 2$ is made smaller than a predetermined value on the alignment chart.

16. The drive control device of the hybrid vehicle according to claim 15, wherein
the differential mechanism includes a sun roller as the first rotating element, a carrier as the second rotating element, a first disc as the third rotating element, a second disc as the fourth rotating element, and planetary balls as the rolling members.

17. The drive control device of the hybrid vehicle according to claim 14, wherein
when the rolling members are disposed in contact between a radially outside portion of the third rotating element and radially inside portions of the first rotating element and the fourth rotating element, respectively, the alignment chart disposes rotation speeds of the first to fourth rotating elements in the sequence of the third rotating element, the second rotating element, the fourth rotating element, and the first rotating element and shows the rotating elements by straight lines and assumes that a rotating speed shaft of the second rotating element internally divides between a rotating speed shaft of the third rotating element and a rotating speed shaft of the first rotating element in a relation of 1:$\rho a1$ by a first planetary gear ratio $\rho a1$ which is obtained by dividing an absolute value of a relative rotation speed of the first rotating element to the second rotating element by an absolute value of a relative rotation speed of the third rotating element to the second rotating element and a rotating speed shaft of the second rotating element internally divides between a rotating speed shaft of the third rotating element and a rotating speed shaft of the fourth rotating element in a relation 1:$\rho a2$ by a second planetary gear ratio $\rho a2$ which is obtained by dividing an absolute value of a relative rotation speed of the fourth rotating element to the second rotating element by an absolute value of a relative rotation speed of the third rotating element to the second rotating element, and when a rotation speed of the first rotating element is reduced, the first planetary gear ratio $\rho a1$ is made smaller than a predetermined value and the second planetary gear ratio $\rho a2$ is made larger than a predetermined value in the alignment chart.

18. The drive control device of the hybrid vehicle according to claim 17, wherein
the differential mechanism includes a first disc as the first rotating element, a carrier as the second rotating element, a sun roller as the third rotating element, a second disc as the fourth rotating element, and planetary balls as the rolling members.

19. The drive control device of the hybrid vehicle according to claim 14, wherein
the differential mechanism includes a sun roller as the first rotating element, a carrier as the second rotating element, a first disc as the third rotating element, a second disc as the fourth rotating element, and planetary balls as the rolling members.

20. The drive control device of the hybrid vehicle according to claim 14, wherein
the differential mechanism includes a first disc as the first rotating element, a carrier as the second rotating element, a sun roller as the third rotating element, a second disc as the fourth rotating element, and planetary balls as the rolling members.

* * * * *